(12) United States Patent
Abraham et al.

(10) Patent No.: US 6,704,348 B2
(45) Date of Patent: Mar. 9, 2004

(54) METHOD AND APPARATUS FOR COMPUTING SIGNAL CORRELATION AT MULTIPLE RESOLUTIONS

(75) Inventors: Charles Abraham, San Jose, CA (US); Donald L. Fuchs, Wyckoff, NJ (US)

(73) Assignee: Global Locate, Inc., San Jose, CA (US)

( * ) Notice: Subject to any disclaimer, the term of this patent is extended or adjusted under 35 U.S.C. 154(b) by 231 days.

(21) Appl. No.: 09/900,499

(22) Filed: Jul. 6, 2001

(65) Prior Publication Data

US 2002/0172267 A1 Nov. 21, 2002

Related U.S. Application Data

(63) Continuation-in-part of application No. 09/861,086, filed on May 18, 2001, now Pat. No. 6,606,346.

(51) Int. Cl.[7] .............................................. H04B 1/707
(52) U.S. Cl. ...................................................... 375/150
(58) Field of Search ................................ 375/142, 150, 375/343; 370/514, 515

(56) References Cited

U.S. PATENT DOCUMENTS

| | | | |
|---|---|---|---|
| 4,426,712 A | 1/1984 | Gorski-Popiel | 375/96 |
| 4,445,118 A | 4/1984 | Taylor et al. | 343/357 |
| 4,527,278 A | 7/1985 | Deconche et al. | 375/97 |
| 4,578,678 A | 3/1986 | Hurd | 343/357 |
| 4,660,164 A | 4/1987 | Leibowitz | 364/728 |
| 5,090,028 A | 2/1992 | Crebouw | 375/106 |
| 5,117,232 A | 5/1992 | Cantwell | 342/357 |
| 5,148,452 A | 9/1992 | Kennedy et al. | 375/96 |
| 5,153,598 A | 10/1992 | Alves, Jr. | 342/352 |
| 5,175,557 A | 12/1992 | King et al. | 342/357.12 |
| 5,185,610 A | 2/1993 | Ward et al. | 342/357 |
| 5,199,050 A | 3/1993 | Linsky | 375/115 |
| 5,237,587 A | 8/1993 | Schoolcraft | 375/1 |

(List continued on next page.)

FOREIGN PATENT DOCUMENTS

| | | | |
|---|---|---|---|
| DE | 4114058 | 11/1992 | H04L/27/00 |
| EP | 0 488 739 | 6/1992 | G01S/5/14 |
| EP | 0 526 040 | 2/1993 | G01S/5/14 |
| EP | 0 635 728 | 1/1995 | G01S/5/14 |
| EP | 0 718 998 | 6/1996 | H04J/13/02 |
| GB | 2016760 | 9/1979 | G06F/15/34 |
| WO | 97/14057 | 4/1997 | |
| WO | 97/40398 | 10/1997 | G01S/5/14 |
| WO | 98/02830 | 1/1998 | G06F/17/15 |

OTHER PUBLICATIONS

Wolfert, et al., "Rapid Direct P(Y)–Code Acquisition in a Hostile Environment," CONFERENCE: Institute of Navigation: Satellite Division–International technical meeting; 11th Proceedings of ION GPS, 1998; VOL 11; No. 1 P: 353–360 Alexandria, VA, Institute of Navigation, 1998.

Lyusin, et al., "Fast Acquisition by Matched Filter Technique for GPS/GLONASS Receivers", CONFERENCE: Institute of Navigation: Satellite Division–International technical meeting; 11th Proceedings of ION GPS, 1998; VOL 11; No. 1P: 307–316 Alexandria, VA, Institute of Navigation, 1998.

*Primary Examiner*—Stephen Chin
*Assistant Examiner*—Kevin Kim
(74) *Attorney, Agent, or Firm*—Moser, Patterson & Sheridan, LLP

(57) ABSTRACT

A method and apparatus for computing a convolution between an input GPS signal and a C/A code reference by generating the convolution result in real time without storing unprocessed signal samples. The method and apparatus is capable of operating in multiple modes of resolution so as to enhance the sensitivity of the convolution processing.

19 Claims, 13 Drawing Sheets

U.S. PATENT DOCUMENTS

| | | | |
|---|---|---|---|
| 5,293,398 A | 3/1994 | Hamao et al. | 375/1 |
| 5,369,668 A | 11/1994 | Yamamoto | 375/14 |
| 5,379,224 A | 1/1995 | Brown et al. | 364/449 |
| 5,426,665 A | 6/1995 | Cleverly et al. | 375/200 |
| 5,579,014 A | 11/1996 | Brooksby et al. | 342/357 |
| 5,579,338 A * | 11/1996 | Kojima | 375/149 |
| 5,600,328 A | 2/1997 | Tachita et al. | 342/357 |
| 5,629,708 A | 5/1997 | Rodal et al. | 342/357 |
| 5,726,659 A | 3/1998 | Kee et al. | 342/352 |
| 5,727,018 A | 3/1998 | Wolf et al. | 375/210 |
| 5,809,064 A | 9/1998 | Fenton et al. | 375/208 |
| 5,812,087 A | 9/1998 | Krasner | 342/357 |
| 5,859,612 A | 1/1999 | Gilhousen | 342/457 |
| 5,872,774 A | 2/1999 | Wheatley, III et al. | 370/335 |
| 5,884,214 A | 3/1999 | Krasner | 701/207 |
| 5,901,171 A | 5/1999 | Kohli et al. | 375/200 |
| 5,907,578 A | 5/1999 | Pon et al. | 375/208 |
| 5,920,278 A | 7/1999 | Tyler et al. | 342/33 |
| 5,999,562 A | 12/1999 | Hennedy et al. | 375/207 |
| 6,002,708 A | 12/1999 | Fleming et al. | 375/200 |
| 6,034,635 A | 3/2000 | Gilhousen | 342/457 |
| 6,047,017 A | 4/2000 | Cahn et al. | 375/200 |
| 6,104,340 A | 8/2000 | Krasner | 342/357.1 |
| 6,111,868 A | 8/2000 | Lee et al. | 370/342 |
| 6,121,923 A | 9/2000 | King | 342/357.12 |
| 6,133,874 A | 10/2000 | Krasner | 342/357.15 |
| 6,151,311 A | 11/2000 | Wheatley, III et al. | 370/335 |
| 6,157,891 A | 12/2000 | Lin | 701/301 |
| 6,181,911 B1 | 1/2001 | Sih et al. | 455/12.1 |
| 6,208,291 B1 | 3/2001 | Krasner | 342/357.12 |
| 6,208,292 B1 | 3/2001 | Sih et al. | 342/357.12 |
| 6,211,820 B1 | 4/2001 | Zou et al. | 342/357.1 |
| 6,236,354 B1 | 5/2001 | Krasner | 342/357.06 |
| 6,239,742 B1 | 5/2001 | Krasner | 342/357.02 |
| 6,252,543 B1 | 6/2001 | Camp | 342/357.06 |
| 6,256,337 B1 | 7/2001 | Hendrickson et al. | 375/140 |
| 6,272,189 B1 | 8/2001 | Garin et al. | 375/343 |
| 6,289,041 B1 | 9/2001 | Krasner | 375/152 |
| 6,307,840 B1 | 10/2001 | Wheatley, III et al. | 370/252 |
| 6,324,227 B1 | 11/2001 | Kang et al. | 375/343 |
| 6,327,473 B1 | 12/2001 | Soliman et al. | 455/456 |
| 6,370,208 B1 | 4/2002 | Kuo et al. | 375/343 |
| 2002/0033767 A1 | 3/2002 | Krasner | 342/357.06 |

* cited by examiner

METHOD AND APPARATUS FOR COMPUTING SIGNAL CORRELATION AT MULTIPLE RESOLUTIONS

CROSS REFERENCE TO RELATED APPLICATIONS

This application is a continuation-in-part of U.S. patent application Ser. No. 09/861,086, filed May 18, 2001, now U.S. Pat. No. 6,606,346, land incorporated herein by reference.

BACKGROUND OF THE INVENTION

1. Field of the Invention

The present invention relates to signal correlators for digital signal receivers and, more particularly, the invention relates to a method and apparatus for performing signal correlation in, for example, a global positioning system (GPS) receiver.

2. Description of the Background Art

The process of measuring a global positioning system (GPS) signal begins with a procedure to search for the GPS signal in the presence of noise by attempting a series of correlations of the incoming signal against a known pseudo-random noise (PRN) code. The search process can be lengthy, as both the exact frequency of the signal and the time-of-arrival delay are unknown. To find the signal, receivers traditionally conduct a two dimensional search, checking each delay possibility at every possible frequency. To test for the presence of a signal at a particular frequency and delay, the receiver is tuned to the frequency, and the incoming signal is correlated with the known PRN code delayed by an amount corresponding to the time of arrival. If no signal is detected, the search continues to the next delay possibility, and after all delay possibilities are checked, continues to the next frequency possibility. Each individual correlation is performed over one or more milliseconds in order to allow sufficient signal averaging to distinguish the signal from the noise. Because many thousand frequency and delay possibilities are checked, the overall acquisition process can take tens of seconds.

Recently, new applications of GPS technology in wireless devices have emerged, for example, the use of GPS in cellular phones to provide emergency location capability. In these applications, rapid signal acquisition in just a few seconds is required. Furthermore, these applications require a GPS receiver to operate in harsh signal environments and indoors, where GPS signal levels are greatly attenuated. Detecting attenuated signals requires each correlation to be performed over a relatively long period of time. For example integration may be performed over a few seconds, as opposed to the 1–10 millisecond period used in traditional GPS receivers. The two dimensional sequential search process employed by traditional receivers becomes impractical at such long integration times, because the overall search time increases by a factor of 100 or more.

To accelerate the search process, GPS designers add additional correlators to the receiver so that multiple time of arrival possibilities can be checked simultaneously. Typically, each correlator that is added requires a separate code mixer and signal accumulator. For a given sensitivity level, this decreases search times in proportion to the number of correlators. To achieve the sensitivity and acquisition time demanded in cellular phone applications, the design might have to incorporate thousands of correlators. This addition is typically prohibitively complex and expensive for a consumer class device.

For example, U.S. Pat. No. 5,901,171, issued May 4, 1999, describes a triple multiplexing technique that allows a single time shared processing block to be used to perform up to 20 simultaneous correlations on each of 12 channels. This offers an improvement in performance relative to single correlator designs since blocks of 20 delay possibilities are checked simultaneously. A full signal search over a full range of delay uncertainties requires using the block of 20 correlators approximately 100 times in succession to check 2046 delays. Thus, if an acquisition must be performed in a few seconds, the integration time is limited to tens of milliseconds. This is insufficient to achieve the sensitivity needed for indoor GPS applications.

To further improve the search process, other GPS receiver architectures include processing capable of generating a convolution between the incoming signal and the known PRN code. This is equivalent to providing a complete set of correlators spanning all time delay possibilities over a full C/A code epoch (1023 chips), and U.S. Pat. No. 5,663,734, issued Sep. 2, 1997, describe fast Fourier transform (FFT) based software techniques to efficiently generate the necessary correlation results using software algorithms. This approach is not suitable for all applications, because a programmable digital signal processor (DSP) is needed to run the software FFT, and a large memory is needed to store unprocessed signal samples. Furthermore, this approach can have a large processing delay due to the software computations and the fact that software processing starts only after a complete snapshot of the signal is stored. In many applications, a real time processing solution is preferred, preferably one that does not involve extensive software processing. Lyusin et al., "Fast Acquisition by Matched Filter Technique for GPS/GLONASS Receivers", pp 307–315 describes hardware approaches to performing the convolution in real time using a matched filter with 1023 taps. The matched filter consists of shift registers large enough to hold a full C/A code epoch, as well as a width 1023 vector multiplier and adder unit that generates the inner product between a full epoch of the signal and the C/A code.

This circuit is complex relative to the constraints of low cost consumer devices such as cellular phones. Other matched filter approaches, such as utilized in military class receivers for P-code acquisition, also incorporate large vector multipliers.

Thus, there is a need for an improved, simple and low cost GPS processing block capable of processing an entire epoch of signal and C/A code. Such a device must be built from hardware of relative simplicity, yet be capable of generating a full convolution, or many parallel correlations, preferably without a large vector multiplier.

SUMMARY OF THE INVENTION

The invention provides a method and apparatus for computing a full convolution between an input signal (e.g., a GPS signal) and a pseudorandom noise (PRN) code reference by generating the convolution result in real time without storing unprocessed signal samples, and without extensive software processing. The apparatus comprises a vector multiplier running at high speed to achieve the same result as a vector multiplier sized to process an entire epoch. The invention can be implemented in an integrated circuit that fits the complexity constraints of a consumer class device such as a cellular phone. The design includes the necessary logic to enable long term averaging of convolution results to ensure high sensitivity. This invention is capable of correlating signals for use in deriving a position location from highly attenuated signals, including signals received indoors.

The complete apparatus consists of a conventional GPS tuner, a decimation circuit, a convolution processor, and RAM blocks that accumulate convolution results. The convolution processor runs at a high clock rate on the order of 100MHz and higher enabling the computation of a full convolution by repeated use of a small block of circuitry. Specifically, each point of the convolution is decomposed into a series of partial correlations, each of which is generated using a vector multiplier that is sized to process only a portion of an epoch. The apparatus organizes the partial correlations by subdividing the C/A code into a non-overlapping set of code segments. Each partial correlation uses only one code segment at a time, allowing the C/A code to be stored and retrieved efficiently, using a simple lookup table.

The processor begins by decimating input IF samples to create a signal stream at a desired sample rate, where the rate is precisely matched to the timing of the incoming signal. If the desired sample rate is $Pf_o$ (P samples per C/A chip) then the sampling rate is set so that exactly 1023×P samples are taken in each signal epoch. The processor correlates the signal clocking signals through shift registers sized to hold P×K input samples, where K is a factor of 1023. At each signal shift, a series of M partial correlation operations are performed with M chosen such that M×K=1023. Each partial correlation consists of taking the inner product of the contents of the signal shift registers with a block of reference samples created by extending a length K segment of the C/A code to P×K samples. Partial correlation results are accumulated in memory. By accumulating partial correlation results, the processor generates complete correlation results for many correlation points, up to the full convolution.

In an alternative embodiment, the invention provides for two modes of operation. In a standard mode of operation, a full convolution is generated using a standard chip spacing, typically ½ a C/A code chip. In a high-resolution mode, a portion of the convolution is generated using a reduced chip spacing, for example, ⅕ of a C/A code chip. The transition between modes is controlled by algorithms and occurs when previous measurements and/or externally available information focus the acquisition in a portion of the convolution in which high-resolution correlations are computed.

DESCRIPTION OF DRAWINGS

The invention can be readily understood by considering the following detailed description in conjunction with the accompanying drawings, where.

DETAILED DESCRIPTION

Figure 1:
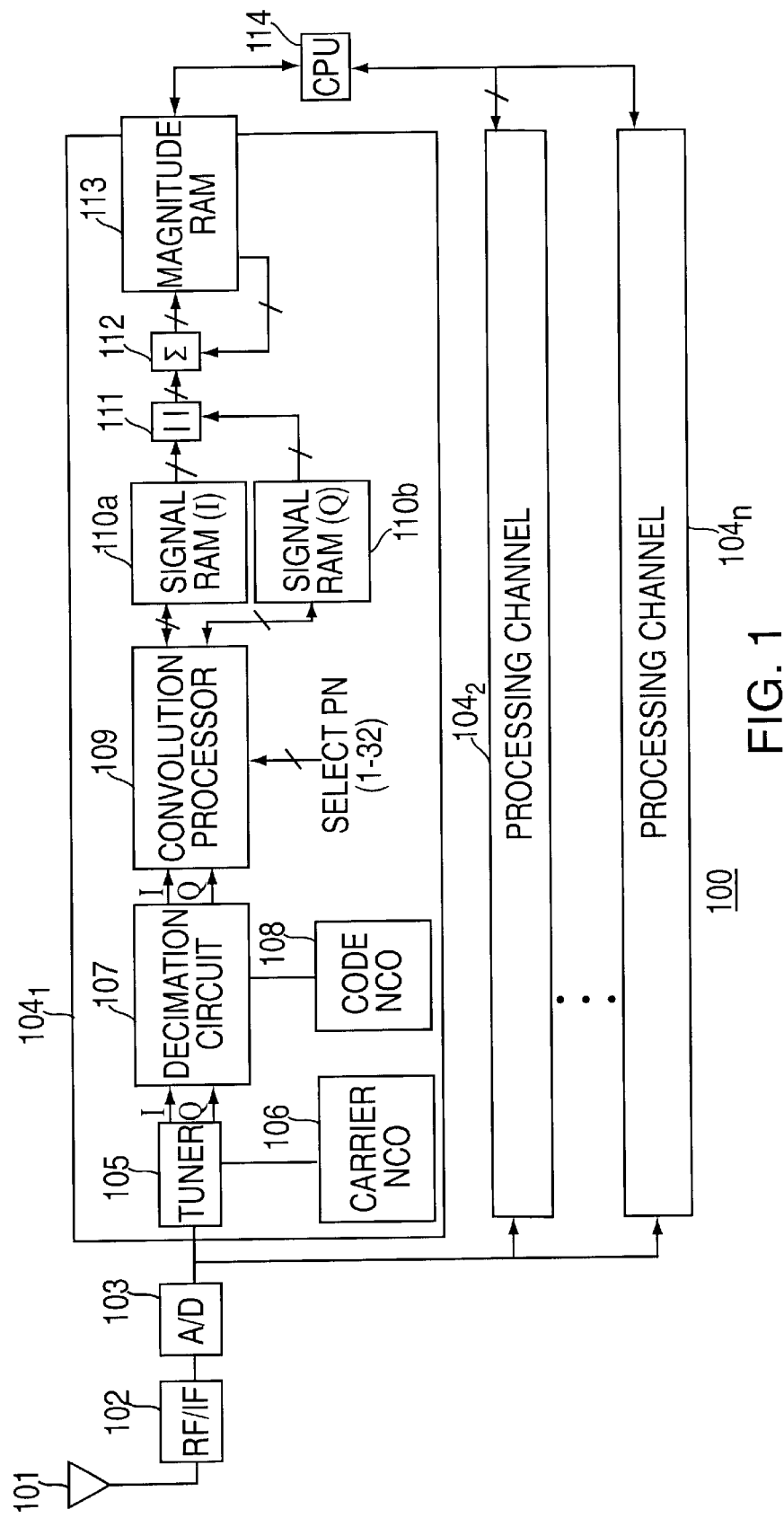
FIG. 1 shows a block diagram of a GPS receiver comprising the present invention.

FIG. 1 depicts a block diagram of a global positioning system (GPS) receiver 100 incorporating the present invention. The use of a GPS receiver as the platform within which the invention is incorporated forms one application of the invention. Other platforms that require signal correlation may find use for the present invention.

Signals (such as GPS signals) are received by an antenna 101. A radio-frequency-to-intermediate-frequency converter (RF/IF converter) 102 filters, amplifies, and frequency shifts the signal for digitization by an analog-to-digital converter (A/D) 103. The elements 101, 102 and 103 are substantially similar to those elements used in a conventional GPS receiver.

The output of the A/D 103 is coupled to a set of processing channels $104_1$, $1042_2$, ... $104_n$ (where n is an integer) implemented in digital logic. Each processing channel $104_n$ may be used to process the signal from a particular GPS satellite. The signal in a particular channel is tuned digitally by a tuner 105, driven by a numerically controlled oscillator (NCO) 106. The tuner 105 serves two purposes. First, the IF frequency component remaining after RF/IF conversion is removed. Second, the satellite Doppler frequency shift resulting from satellite motion, user motion, and reference frequency errors is removed. The output from the tuner is a baseband signal consisting of an in-phase component (I) and a quadrature component (Q). The tuner 105 and Carrier NCO 106 are substantially similar to those used in conventional GPS receiver designs.

A decimation circuit 107 processes the output of the tuner 105. The output of the decimation circuit 107 is a series of complex signal samples with I and Q components, output at a rate precisely timed to match the timing of the input signal. In one embodiment of the invention, the decimation operation is a simple pre-summer that sums all the incoming signal samples over the period of an output sample. A numerically controlled oscillator (NCO) 108 is used to time the sampling process. For example, if P=2, the code NCO 108 is set to generate a frequency of $(2 \times f_s)$, where $f_s$ is $f_o$ (the GPS signal's C/A code chipping rate), adjusted for Doppler shift. The NCO adjusts for Doppler shift based on external input from firmware commands. Because the Doppler shift is different for each satellite, a separate code NCO 108 and decimation circuit 107 is required for each channel $104_n$. It should be noted that there is no requirement that the incoming sample rate be an integer multiple of the $f_s$, as the code NCO 108 is capable of generating an arbitrary frequency. If the decimation circuit 107 is a pre-summer, the number of samples summed will typically toggle between two values, so that over the long term, the correct sample timing is maintained. For example, if the incoming sample rate is 10

MHz, and the desired sample rate is 2.046 MHz, the pre-summer will add either 4 or 5 samples, so that the desired sample rate is maintained on average.

The decimation circuit 107 may also include a quantizer (not shown) at its output to reduce the number of bits in the signal components before further processing. In one embodiment of the invention, 2-bit quantization is used.

The signal samples from decimation circuit 107 are coupled to a convolution processor 109. The convolution processor 109 generates results that are stored in signal random access memories (RAMs) 110a and 110b. Specifically, these RAMs 110a and 110b hold a complex vector that makes up all or part of the full convolution between the input signal and a reference PN code (e.g. a GPS C/A code). The convolution result will have a peak at points corresponding to high correlation between the signal and reference (the PN code). As shall be discussed in detail below, the relative location of these peaks for various satellite signals is used to ultimately compute position information.

The convolution processor 109 and signal RAMs 110a and 110b accumulate convolution results for multiple epochs of the GPS signal, which repeats at nominal 1 millisecond intervals. For example, if 10 milliseconds of the signal are processed, the values in RAM 110a and 110b are the sum of 10 correlation results each generated over one epoch. All the individual correlations should have a similar characteristic, since the timing of the decimation operation ensures that samples are taken at the same relative moment within each epoch. Accumulating similar results from individual correlations improves the signal to noise ratio, enhancing the ability of the receiver to detect weak signals. This processing may be referred to as coherent integration and, as will be discussed, can be combined with magnitude integration to yield correlation results averaged over a time period of up to several seconds.

The length of time over which coherent integration interval is performed is limited by several factors, including uncompensated Doppler shift, GPS signal navigation data bits, and phase shifts induced by motion of the receiver 100. These factors introduce slow, but seemingly random phase variations into the signals. Over many tens of milliseconds, these phase changes cause destructive interference that defeats the purpose of coherent integration. Therefore, to achieve long averaging intervals, the receiver 100 performs a secondary step of magnitude accumulation. Specifically, the signals stored in the signal RAMs 110a and 110b are periodically output to a complex normalizer 111 that generates a complex magnitude value of the complex convolution vector. The complex magnitude values are accumulated by an adder 112 and stored in magnitude RAM 113. Each time the complex magnitude of the signal is computed, the signal RAMs 110a and 110b are cleared to allow another coherent integration to occur. The process continues until the desired number of magnitude accumulations is completed. For example, if the coherent averaging interval is 10 milliseconds, and 200 magnitude accumulations are desired, the total process will run over 2 seconds.

After convolution processing, the magnitude RAM 113 contains a vector containing the complex magnitude of the convolution result, integrated to improve signal-to-noise ratio. As shall be discussed below, this vector is further processed by software algorithms that are executed by the CPU 114 to produce pseudorange data that is used to yield the position of the receiver. It should be noted that the CPU computational load for these steps is quite modest compared to a conventional GPS receiver or an FFT based correlator. In this implementation, the computationally intensive tasks of correlation and integration are completed prior to software processing.

Figure 2:
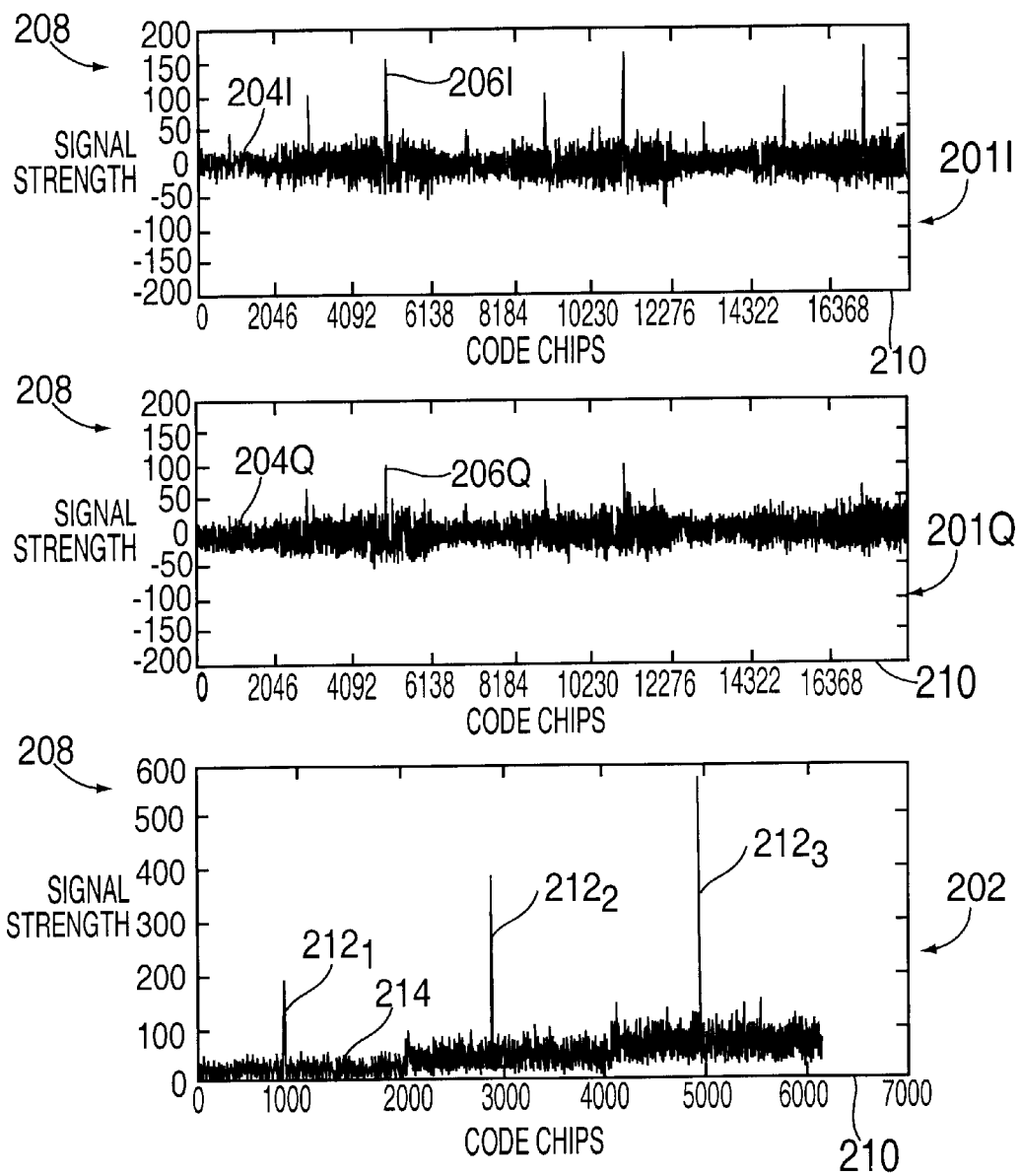
FIG. 2 shows an example of waveforms produced by the invention of FIG. 1.

FIG. 2 depicts waveforms 201I, 201Q and 202 generated by the components of FIG. 1. The waveforms 201I, 201Q and 202 are plots of signal strength (axis 208) versus code chips (axis 210). The waveforms depict the output of the convolution processor 109 during coherent integration and magnitude integration. For clarity, only 9 milliseconds of signal processing time is shown consisting of 3 magnitude accumulations each based on 3 coherent integrations. In the example, P=2, so there are 2046 signal samples per coherent integration. Waveforms 201I and 201Q are the output from the convolution processor 109 where 201I is the I-component of the output and 201Q is the Q-component. Each block of 2046 samples is a full convolution result, generated in real time by the convolution processor 109 from the 2046 signal samples processed during the interval. The convolution result contains noise except in the vicinity of a single peak (such as indicated by reference numbers 206I and 206Q) corresponding to the time delay of the signal. The signal repeats every epoch, so the peak reappears each 2046 samples. Over the first three cycles, correlation results are accumulated in the RAM 110a and 110b by summing values at corresponding delays from each epoch. (For example, the values at output time 4 are summed with the values at output time 2050 and 4096.) The correlation peak always appears at the same delay offset and the size of the peak increases over the accumulation, roughly tripling over 3 epochs. The level of the noise also increases, but rises only as the square root of 3 because the noise correlation is uncorrelated from epoch to epoch. The signal to noise ratio improves through the accumulation process, increasing by roughly the square root of 3. Waveform 201Q illustrates the same signal accumulation process occurring in the quadrature channel.

Beginning with the $4^{th}$ cycle of the signal, the signal RAMs 110a and 110b are cleared to zero, and the signal accumulation process begins again. Waveforms 201I and 201Q show the correlations accumulating and dumping 3 times over 9 signal epochs.

At the end of the coherent averaging interval the accumulated signal's magnitude is computed and summed into the magnitude RAM 113. The signal in the magnitude RAM 113 is shown as waveform 202. In the example, the waveform 202 updates three times corresponding to the completion of each coherent integration. The peaks are identified by reference numbers $212_1$, $212_2$, $212_3$ and noise is identified by reference number 214. As can be seen, the signal-to-noise ratio increases with each magnitude accumulation, further enhancing the ability of the system to identify the peak corresponding to the time of arrival.

It should be noted that in the example, the complex phase of the signal varied over the 9 epochs. In particular, the signal was initially present in both I and Q channels, but by the final epoch, had rotated so that the signal was strong in the I channel and nearly absent in the Q channel. As mentioned above, imperfect Doppler shift tuning and other effects cause this rotation. Over many epochs, the phase would rotate through many cycles, resulting in cancellation of the signal when accumulated. For this reason, the inventive receiver accumulates coherently over only a short interval, relying on magnitude (non-coherent) accumulation for long term averaging. Magnitude values are independent of phase, and may be successfully integrated over several seconds.

Figure 3:
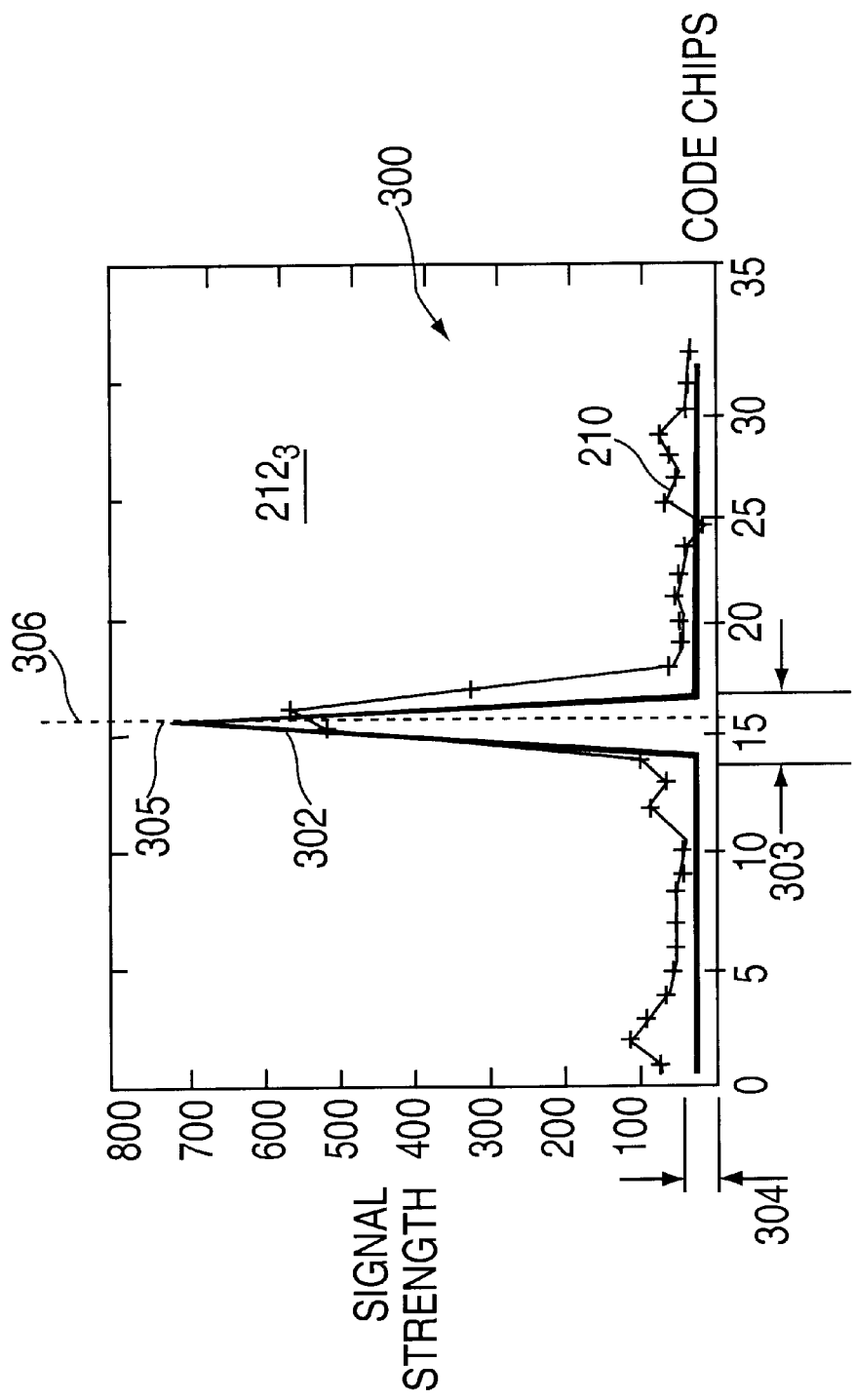
FIG. 3 shows details of an accumulated magnitude waveform of FIG. 2.

FIG. 3 illustrates the accumulated magnitude waveform 202 in greater detail. The plot 300 shows the magnitude of the convolution in the vicinity of a peak $212_3$ corresponding to the time delay of the signal. Points on the code chip axis 210 are spaced at an interval equal to the C/A code chip length divided by P, where P is the ratio of the signal sampling rate to $f_o$, the C/A code chipping rate. In the example, P=2, so the points are spaced at ½ chip intervals, or approximately 500 ns. (This spacing in time corresponds to a range difference of 150 meters). In order to achieve pseudorange measurements on the order of ten meters or better, the convolution results are further processed, typically in the CPU 114, to produce the position information. There are numerous interpolation techniques that can be used to estimate the true time delay, using the discrete correlation values provided by the convolution process. One embodiment uses a least squares estimation technique to identify parameters of a signal that best fits the noisy measured data. The ideal response of a signal is the magnitude of the autocorrelation of the signal. This waveform can easily be shown to have the form of a raised triangle 302. The width 303 of the triangle base is exactly 2 C/A code chips, or 4 points on the convolution result (for the P=2 case). The height 304 of the base of the triangle is the magnitude of the noise in the convolution for time delays not corresponding to the signal. The magnitude of this noise can be estimated from the data or pre-calculated based on design parameters, such as the amplifier noise figure, cable and filter loss and system temperature. The peak 305 of the triangle and the center 306 of the triangle are unknowns corresponding to the signal magnitude and time delay. The least squares method can be used to estimate these two parameters so as to fit the noisy data points to a triangle with a given peak and center.

Figure 4:
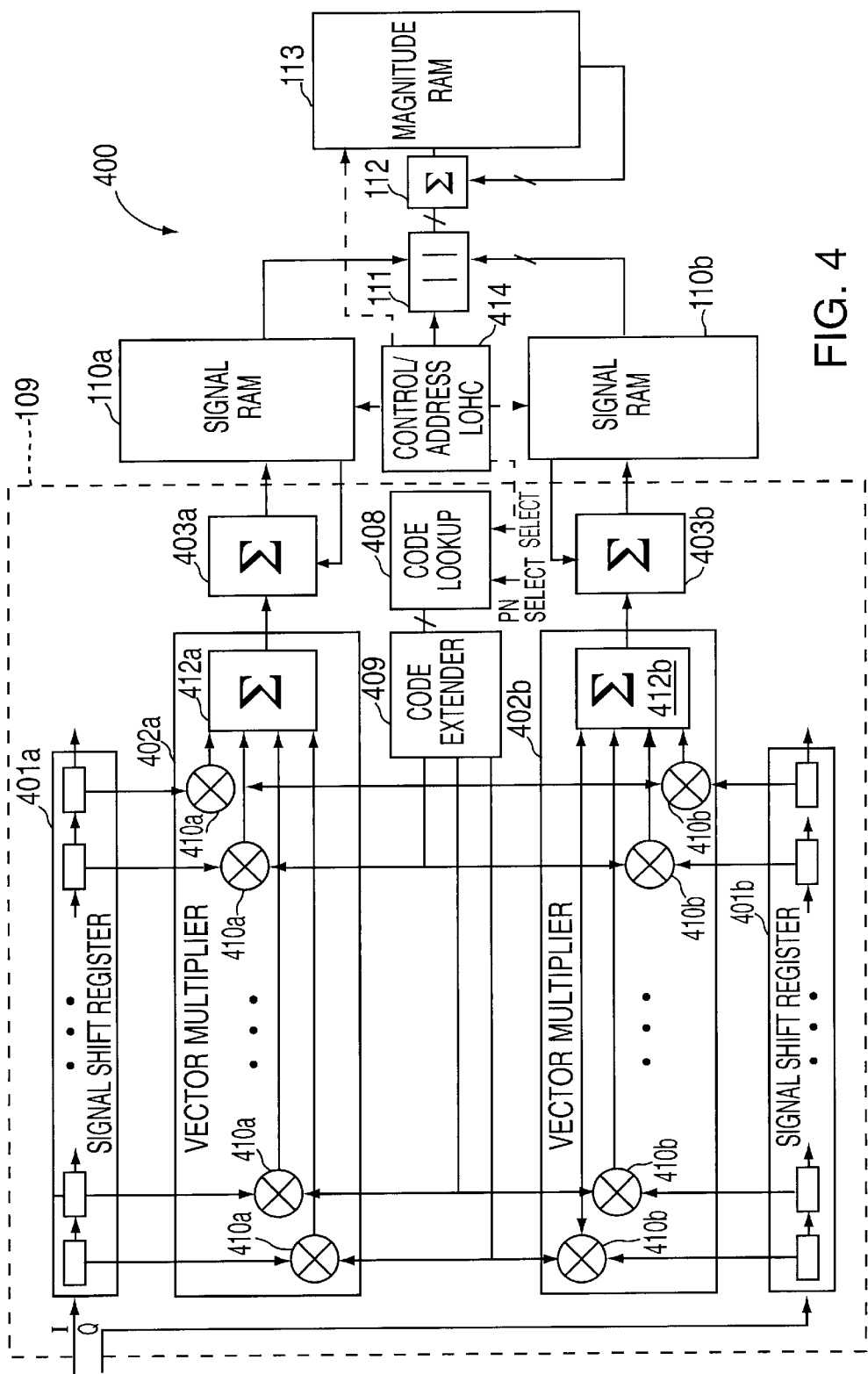
FIG. 4 shows a detailed block diagram of one embodiment of the convolution processor and the convolution results processing circuits.
Figure 5:
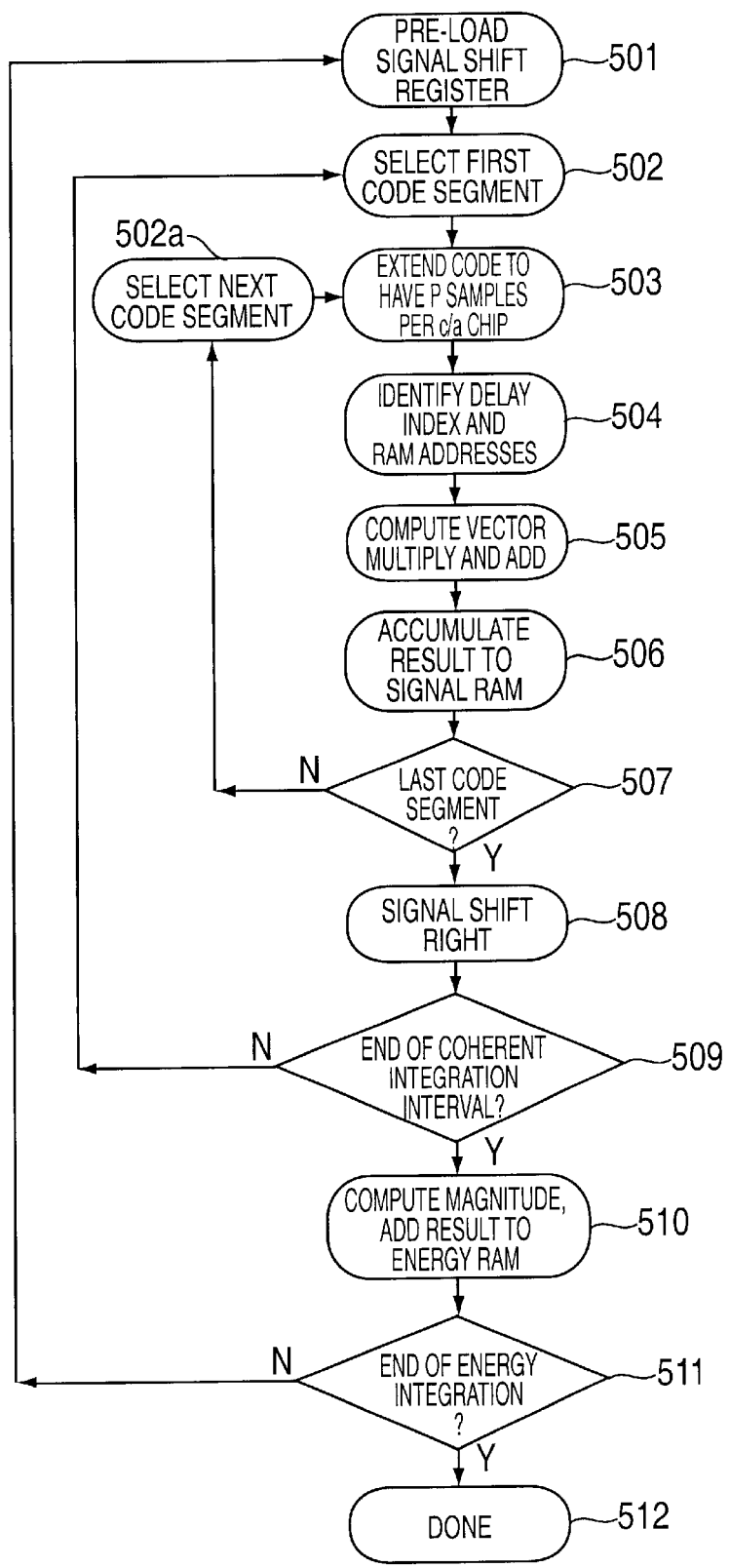
FIG. 5 depicts a flow diagram of a method of operation of the invention of FIG. 1.

FIG. 4 depicts a detailed block diagram of the convolution processor 109 (as well as the convolution results processing circuits 400), in particular details showing how a full convolution is generated by repeated use of a small block of circuitry. Operation of the circuits in this embodiment can be best understood with simultaneous reference to FIG. 4, a flow diagram of FIG. 5 representing the operation of the processor 109 of FIG. 4, and by comparison of the simple examples of FIG. 6 and FIG. 7.

Signals from the decimation circuit 107 are coupled to shift registers 401a and 401b, handling I and Q components, respectively. Each shift register 401a and 401b is of length P×K, where P is the desired number of samples per C/A code chip, and K is chosen as a design parameter. As will be explained K is a factor of 1023. To simplify the discussion, the remainder of the discussion focuses on one particular embodiment with P=2 (samples spaced ½ chip apart) and K=33. This means of advancing the signal through the shift register eliminates the need for circuitry to double-buffer the signal, reducing the cost and complexity of implementation.

Signals advance through shift registers 401a and 401b at the rate of $2f_o$, as timed by the code NCO 108. The signals remain in place in the shift registers for many clock cycles, so that a series of partial correlation operations can be performed. Specifically, a total of M partial correlations are performed, where M=1023 /K or 31 in this example. Each partial correlation consists of a fast vector multiply and add operation between the contents of each signal shift register and a segment of the code containing P×K (e.g., 66) code samples. The fast vector multiplication and addition occurs in circuits 402a and 402b. Circuits 402a and 402b respectively comprise multipliers 410a and 410b and summers 412a and 412b. The operation consists of multiplying each of the 66 signal samples in the signal register 401a or 401b by 66 code samples (formed by extending 33 code samples with the code extender 409), and summing the results in summer 412a and 412b. The operation occurs separately and simultaneously in the I and Q channels. Mathematically, this operation is referred to as an inner product, defined as $$\sum_{i=1}^{P \times K} <signal_i> <code\ c_i>$$

The output of the vector multiply and add may be re-quantized to keep the numbers in a small range so as to avoid overflowing RAMs 404a and 404b. For simplicity, the quantizer is not shown. In one embodiment, the requantization is to 2 bits of resolution.

The results of the vector multiply and add are accumulated by adders 403a and 403b and processed by the convolution results processing circuits 400. Circuits 400 comprise signal RAM 110a, 110b, complex normalizer 111, adder 112 and magnitude RAM 113. The accumulation process consists of reading from RAM 110a and 110b the current values for a particular time delay, adding the just computed partial correlations, and writing the sums back to RAMs 110a and 110b. By properly combining partial correlations that correspond to a particular time delay, the full correlation for that delay is computed. As described previously, the process continues for as many epochs of the signal as desired to enhance signal to noise ratio. Thus, the adders 403a and 403b serve two purposes: the combining of partial correlations within an epoch; and the accumulation of correlations across several epochs.

The outputs from signal RAMs 110a and 110b are combined in complex normalizer 405 to form the magnitude of the signal. The I and Q waveforms in these RAMs 110a and 110b can be viewed as the real and imaginary part of a complex waveform. Forming the magnitude consists of squaring each component, summing the results, and taking the square root of the result. There are several approximations to the magnitude that can be used to simplify circuitry. In one embodiment, the complex magnitude is approximated by taking the scalar magnitude of I and Q independently and determining which is larger. The magnitude can be approximated by taking the larger magnitude and adding it to the one half of the smaller magnitude.

The results of the magnitude operation may be scaled to keep the values in a small range so as to avoid overflowing RAM 113. For simplicity, a scaler is not shown. In one embodiment, the scaling consists of shifting the result by 3 bits (i.e., divide by 8).

It would also be possible to accumulate signal powers rather than signal magnitudes. In this case, the operation in 405 would be power estimation, typically computed by taking the sum of the squares of I and Q. In this case, the pseudorange determination algorithms described in reference to FIG. 3 would have to be slightly modified to perform a fit against a power waveform as opposed to a magnitude waveform. Alternatively, additional nonlinear operations could be used to generate values representative of the magnitude or power of I and Q.

The output from complex normalizer 111 is accumulated by the adder 112 into magnitude RAM 113. The accumulation process consists of reading from RAM 113 the current magnitude value for a particular time delay, adding in the just computed magnitude result, and writing the sum back to the RAM 113. As discussed previously, the magnitude accumulation continues for as many cycles as required to achieve signal to noise ratio enhancement.

The vector multipliers 402*a* and 402*b* perform M partial correlations for each shift of the signal. A code lookup circuit 408 generates the reference code samples for each partial correlation. The lookup is controlled by two lookup indexes. First, the code must be selected from 1 of 32 codes. This selection is constant through the convolution process and is established when the processing channel is configured to correlate for a particular satellite signal. The second index is a segment index between 1 and M. Each C/A code consists of 1023 chips, which are divided into M non-overlapping segments each consisting of K adjacent code chips. The lookup index identifies which code segment is needed. The output from the code lookup circuit is K chips comprising the segment. The selection process is controlled by Control/ Address Logic 414.

The code extender 409 takes as its input K chips of a segment and extends the segment into K×P code samples. The extension operation consists of converting each code chip into P identical code samples. The output from the code extender 409 forms the reference code input to vector multipliers 402*a–b*. In the example, the output from the code extender is 66 samples made up of 33 unique values, each replicated twice.

The architecture shown in FIG. 4 requires a clock that is substantially faster than the C/A code rate $f_o$. For example, if two samples per C/A code chip are used (P=2) and K and M are to be 33 and 31 respectively, achieving the full convolution requires performing 31 partial correlations for each shift of the signal shift register, which advances at rate $2 \times f_o$. Typically, at least two clock cycles are required to read and write RAMs 110*a* and 110*b*. Assuming two clock cycles, the minimum clocking rate required to achieve the full convolution is:

$$f_{clk} = 2 \times 31 \times 2 \times f_o = 2 \times 31 \times 2 \times 1.023 \text{ MHz} \approx 127 \text{ MHz}$$

This rate is easily achievable in modern integrated circuit logic.

It should be noted that the invention could also be used to compute a subset of the full convolution. In this case, fewer than M partial correlations are performed for each shift of the signal shift register. In this case, the total range of delays will be less than the P×1023 making up a full convolution. In particular if $M_2$ partial correlations are performed, then $M_2$ times K times P delay values are generated. The clocking rate to the processor is reduced by the ratio of $M_2$ to M. Furthermore, the size of the RAMs is reduced by this ratio as well. Thus, this alternative may be useful in systems that do not have the computation or memory resources to process the full convolution.

Other choices for K and M result allows further design tradeoffs to be made, however, since the prime factors of 1023 are 3, 11, and 31, the choices for K and M are limited. Reducing K is desirable since this reduces the size of the shift registers 401*a* and 401*b* and the complexity of the vector multipliers 402*a* and 402*b*, but requires a larger M and therefore a large clocking rate. The choices for K are 3, 11, 31, 33, 93. These choices would require clocking rates of 1.39 GHz, 380 MHz, 135 MHz, 127 MHz, and 45 MHz respectively (always assuming P=2 and 2 clock cycles per partial correlation.) Based on the technology available at the time of the demonstration, the K=33 choice was made for one embodiment. With future technologies, the choice of K=11 and a clock rate of 380 MHz may become viable and would result in a further reduction of the logic complexity. Thus, the architecture has the desirable attribute of supporting optimized tradeoffs between speed and logic complexity.

The sequencing of code segments is controlled by control logic 414. This control logic also identifies the correct addresses for the RAMs 110*a*, 110*b* and 113. As will be discussed below, the partial correlations are generated in a non-sequential order, thus the generation of RAM addresses is non-trivial.

The operation of the circuits of FIG. 4 can also be understood by reference to the flow diagram of FIG. 5. Operation begins at step 501 with pre-loading of the signal shift registers 401*a* and 401*b*. At this point, convolution processing can begin. At step 502, a code segment is accessed for the particular partial correlation. At step 503, the code segment is extended by the code extender to have P samples per C/A chip. Next, at step 504, the delay index and corresponding RAM addresses are computed. The delay index indicates which point of the full convolution will be updated by the partial correlation. As will be apparent from the example discussed in conjunction with FIG. 7, the delay index jumps around in a non-linear, but deterministic manner. The address computation is a function of the number of signal shifts and the code segment.

At step 505, the partial correlation is computed using the vector multipliers 402*a* and 402*b*. At step 506, the result is accumulated into the signal RAMs at the location indicated by the delay index. Next at step 507, a check is made to determine whether the processing has reached the end of the coherent integration interval. If not, the method returns back to step 502*a*, and repeats for the above steps for the next code segment.

If, at step 507, the check indicates that partial correlations are complete for all code segments (e.g., 31 partial correlations), the method proceeds to step 508. At step 508, the signal registers 401*a* and 401*b* are shifted by one sample.

The process then moves to step 509, where a check is performed to see if the last shift encountered the end of the coherent integration interval. If not, the process cycles back to the start at step 502. If the check indicates the end of the coherent integration interval, then the method continues to step 510, where the signal magnitude is computed by complex normalizer 111. The result is added using adder 112 and stored in the magnitude RAM 113. Next, at step 511, a check is made to determine if all magnitude accumulations have been performed. If so, the method completes at step 512. If not, processing continues by performing the next partial correlation at step 501.

Figure 6:
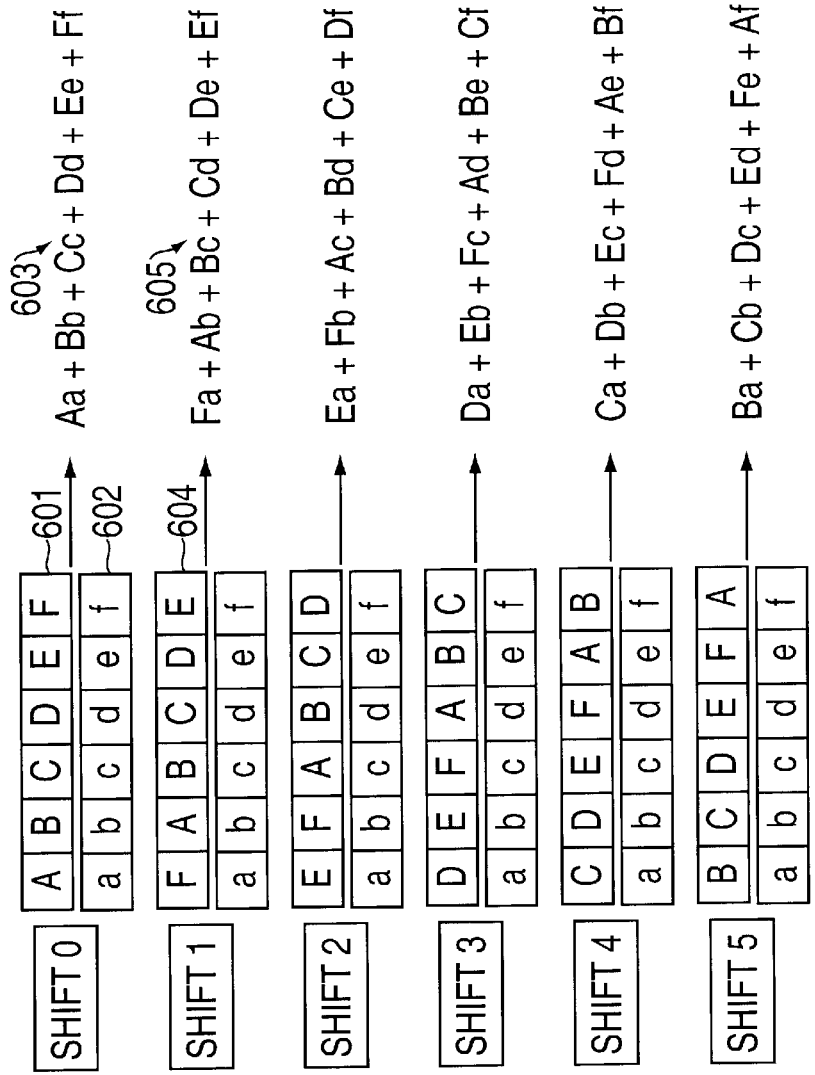
FIG. 6 graphically illustrates a simplified example of computing a full convolution in the traditional manner.
Figure 7:
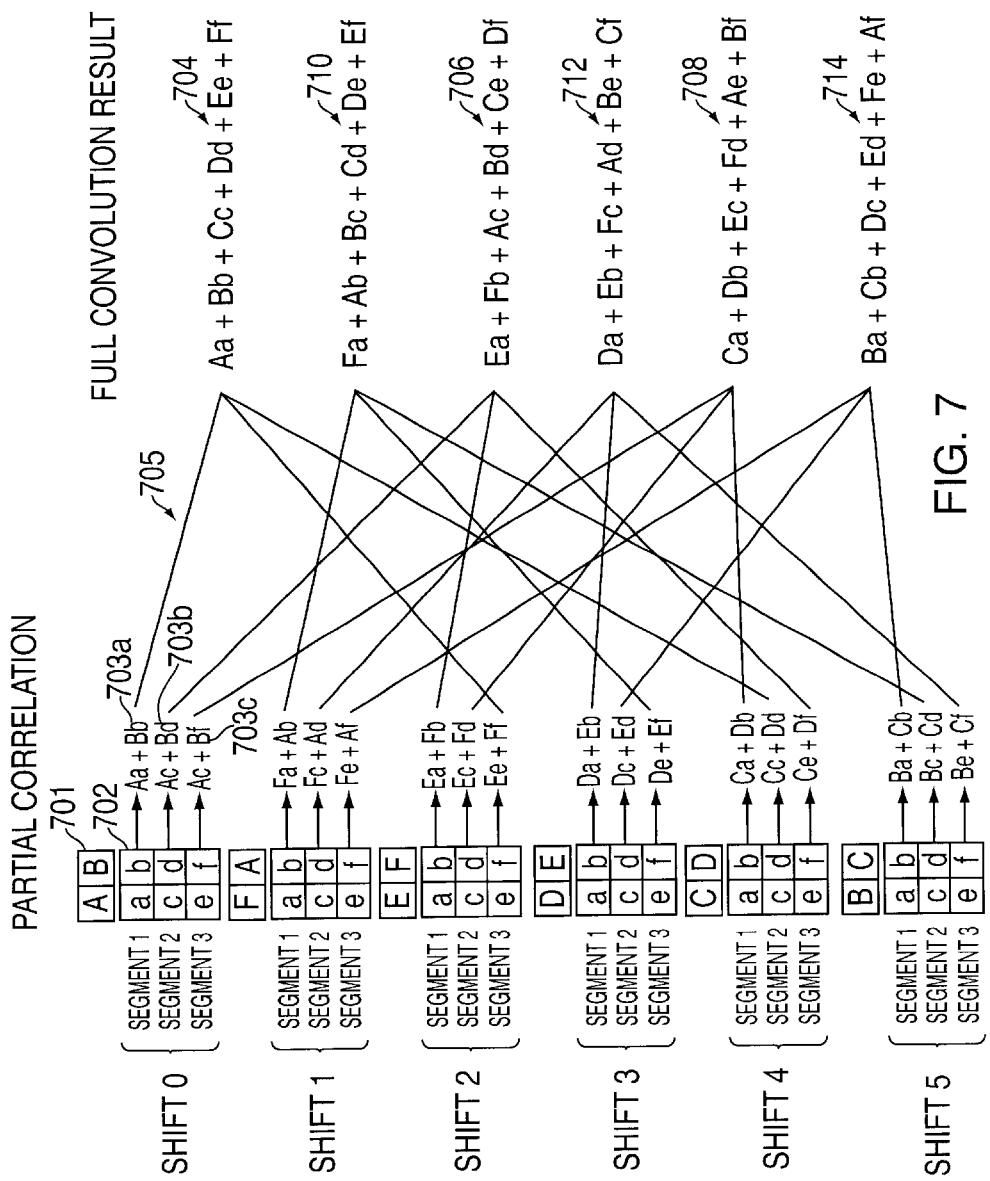
FIG. 7 graphically illustrates how the full convolution of FIG. 6 is performed using the invention.

FIG. 6 and FIG. 7 illustrate, through a simplified example, how the invention utilizes partial correlations to accumulate a full convolution result. For clarity, these diagrams illustrate convolution of a very short length 6 code, as opposed to the length 1023 C/A code of a GPS signal. To further simplify the example, one sample per code chip is used, i.e. P=1. FIG. 6 illustrates convolution through a standard matched filtering approach, and FIG. 7 illustrates the identical convolution through the method of combining of partial correlations. The details of FIG. 7 are helpful in understanding overall operation of the invention. Both methods generate identical convolution results.

FIG. 6 shows the operation of a conventional matched filter for a length 6 signal. Operation begins at a moment in time indicated as shift 0. At this moment, 6 consecutive signal samples comprising an entire cycle of the signal are in the signal shift register 601. Individual samples are labeled with uppercase indices A, B, C, D, E, and F. Code samples for the entire length 6 code are held in reference register 602 and are labeled with lowercase indices a, b, c, d, e, and f. At the time of shift 0, a vector multiplication and add is performed to generate the correlation result for shift 0. Each signal sample is multiplied by a corresponding code sample and the results are summed to yield correlation result 603.

Next, the signal shift register 604 is advanced by one sample, as indicated by shift 1. The signal is periodic, so the new sample introduced at the left side of the register is identical to that shifted out to the right. The shifted contents of the register 604 are now samples with indices F, A, B, C, D, and E. The code is not shifted. The vector multiplication and addition now yields a correlation result 605 for shift 1. This process of shifting continues for 5 additional shifts, at which point all 6 correlation results making up the full convolution are available.

FIG. 7 illustrates how the same convolution result can be obtained through the method of partial correlations. As described, the invention requires that the code be factored into M segments of length K. In the simplified example of FIG. 7, the length 6 code was factored into 3 segments of length 2, i.e. K=2 and M=3. Operation begins at a moment in time indicated at shift 0. At this moment, two signal samples are held in the signal shift register 701. The signal samples are labeled with uppercase indices A and B. The 6 samples of the code are contained in 3 segments each of length 2. The first code segment 702 contains 2 code samples labeled with lowercase indices a and b. The signal is held in place for 3 partial correlation operations, resulting in partial correlation results 703a, 703b and 703c. The first partial correlation result is created by a vector multiplication and addition between the contents of the signal register and the first code segment (segment 1). The second and third results are created by vector multiplications of the signal register with the second and third code segments respectively. Note that the signal register is held in place for a sufficient time for all three-vector multiplications to be performed, and that the code is not shifted during this time, rather different code segments are selected.

The partial correlation results are accumulated into the memory according to the signal paths 705. For example, at shift 0, the partial correlation from the first code segment sums into the correlation result 704. The partial correlation from the second segment sums into the correlation result 706 for shift 2. The partial correlation from the third segment contributes to the correlation result 708 for shift 4.

After three partial correlations, the signal is shifted. At this stage, indicated as shift 1, the signal register contains samples F and A. Again, three partial correlations are generated with the same three code segments as before. The results from these partial correlations contribute to correlation results 710, 712, 714 respectively for shifts 1, 3, and 5. The process continues for 4 additional signal shifts, at which time the full convolution result is available. As can be seen, the operation requires generating a total of 18 partial correlations that contribute to the 6 full results comprising the convolution.

The architecture described by FIG. 7 illustrates two important properties of the invention. First, it is apparent that the full convolution was produced for a length 6 code using only a shift register and vector multiplication and addition unit of length 2. This requires less circuitry than the FIG. 6 where these elements are of length 6. Second, in FIG. 7, the code samples are accessed in fixed segments that are the same for each shift, and each segment is a separate non-overlapping section of the code. Thus, a simple lookup or register scheme can be used to provide the code to the vector multipliers, as will be discussed further in reference to FIG. 8 and FIG. 9. These schemes require less circuitry than other architectures that might, for example, require large blocks of code bits to be made available in a more complex set of permutations. The invention also eliminates the need to provide code generation circuitry.

Figure 8:
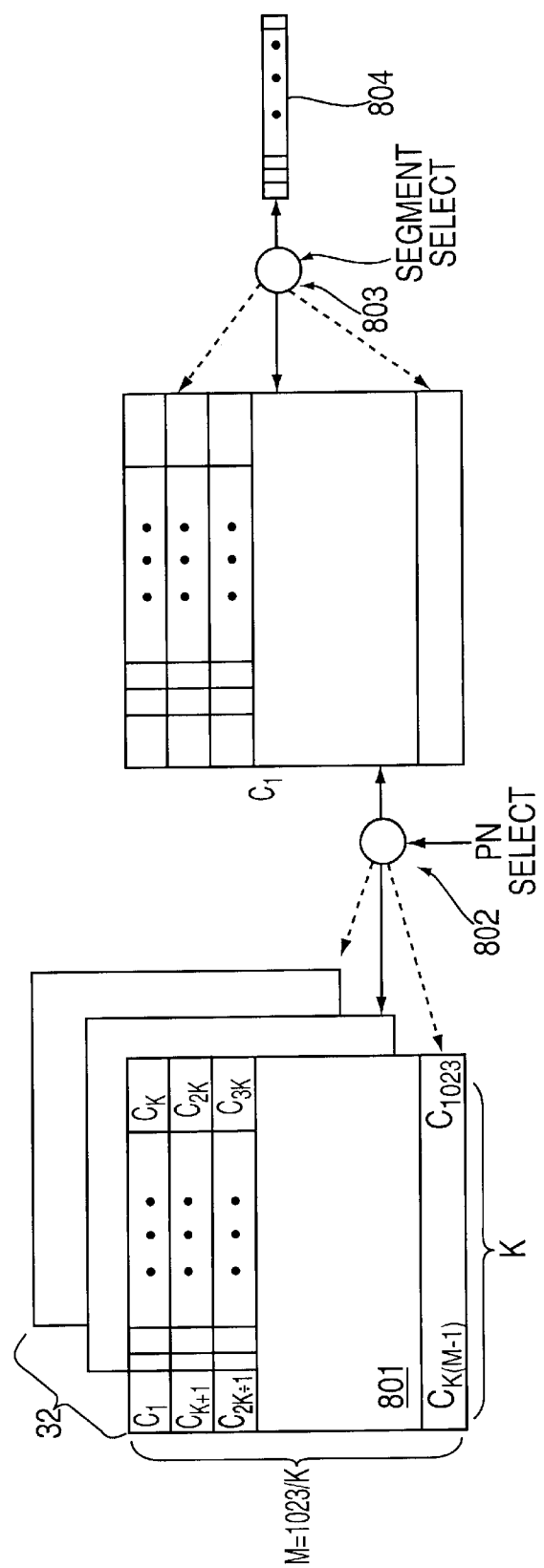
FIG. 8 illustrates an embodiment of a code lookup apparatus suitable for use in the invention of FIG. 1.

FIG. 8 shows a block diagram of one embodiment of a code lookup circuit 408. Table 801 contains stored values for all 1023 bits of each of 32 codes, for example in read-only memory (ROM) or hard-wired logic. The table 801 is organized as 32 sub-tables, one for each code. Each sub-table is further organized as M segments of length K where K×M=1023, and K and M are chosen as described previously. Multiplexer 802 selects a particular code based on a select value. The output of multiplexer 802 is a particular sub-table for the desired code. Multiplexer 803 selects a particular segment based on a segment select value between 1 and M. The output of 803 is a particular code segment 804, of length K, which contains code bits provided to code extender 409.

It should be noted that multiplexer 803 must be high speed in order to allow the code segment to be changed each partial correlation, i.e. every two clock cycles. For this reason, it is necessary that all code bits be pre-stored stored in table 801, as opposed to being generated on the fly in the traditional manner of a code generator.

The circuits of FIG. 8 are intended to be illustrative. In practice, there are many different circuit designs that are functionally equivalent. In particular, the process of logic synthesis used in modern ASIC design will lead to a certain pattern of gates that achieves a behavior equivalent to that described above but not necessarily using multiplexers in the manner described.

Figure 9:
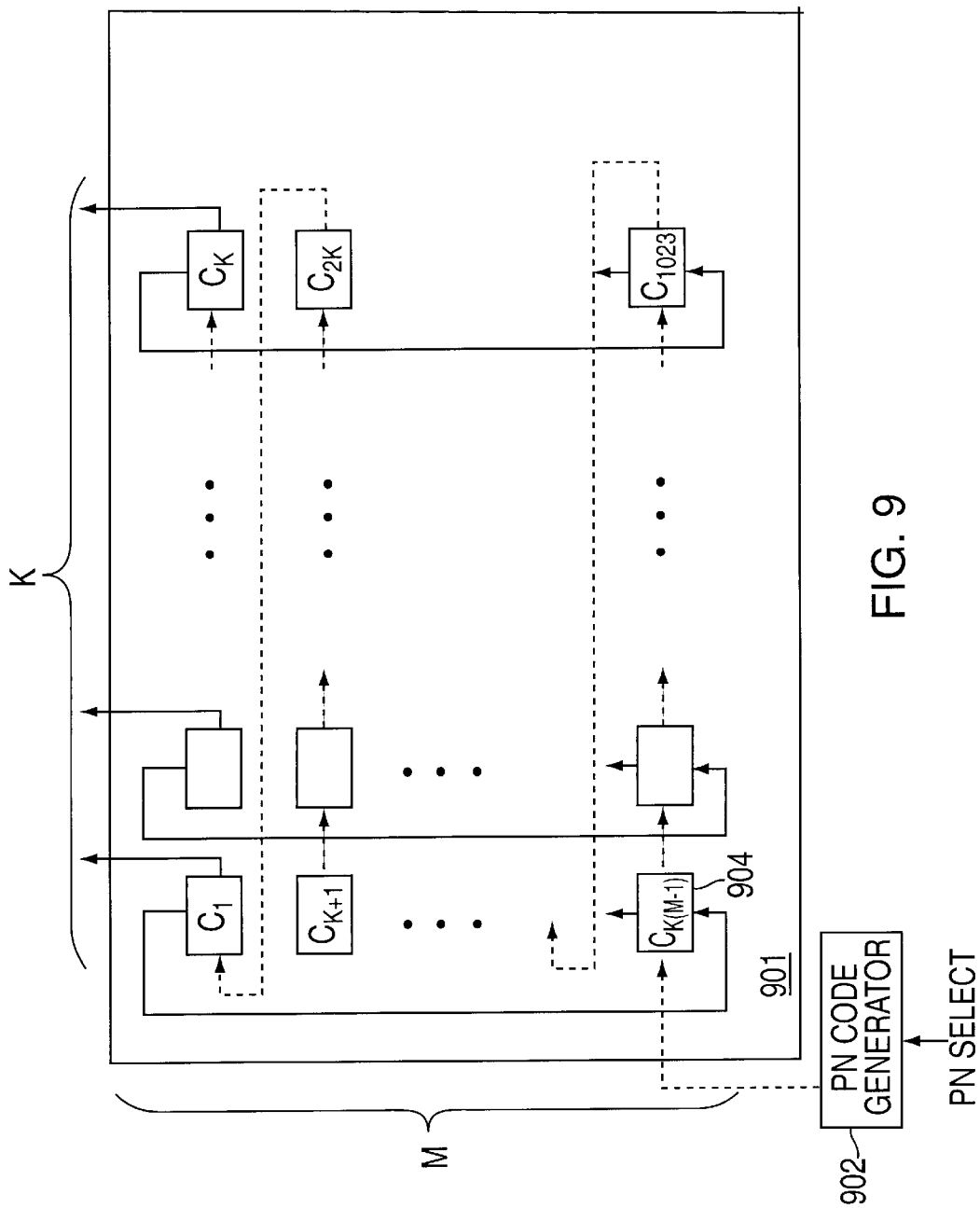
FIG. 9 illustrates an embodiment of a two-dimensional code shift register suitable for use in an alternate embodiment of the invention of FIG. 1.

FIG. 9 shows a block diagram of an alternate embodiment of a code lookup circuit 408. The 1023 code bits corresponding to a particular code are held in 1023 dual-directional shift registers 901, organized as M rows of length K. The shift registers operate in two modes: a running mode, and a loading mode.

In the running mode, each register 901 is configured to shift its sample to the register above it in the next row, except for the top row of registers that shifts to the bottom row of registers. The shift directions for running mode are indicated by solid arrows within 901. By clocking all the registers, rows of code bits will circulate, such that at any one time the top row contains one of M code segments of length K. This top row of bits is provided to code extender 409. The registers circulate rapidly, so that a different code segment is made available for each partial correlation.

In the loading mode, each register is configured to shift its sample to the register next in its row, except for the last column of registers, which shift to the first column of registers in the row above. The shift directions for loading mode are indicated by dotted arrows within 901. The left-hand lower shift register 904 is connected to code generator 902. The code generator is a traditional code generator, capable of sequentially creating the 1023 code bits of a particular code based on a select value. When the code lookup circuit is configured for a particular code, the registers are placed in the loading mode, and the generator is used to generate the bits of the code, which then clock through the registers. After all bits have been clocked through, the code will reside in the registers as M segments of length K. The circuit is then ready for use in the running mode.

Figure 10:
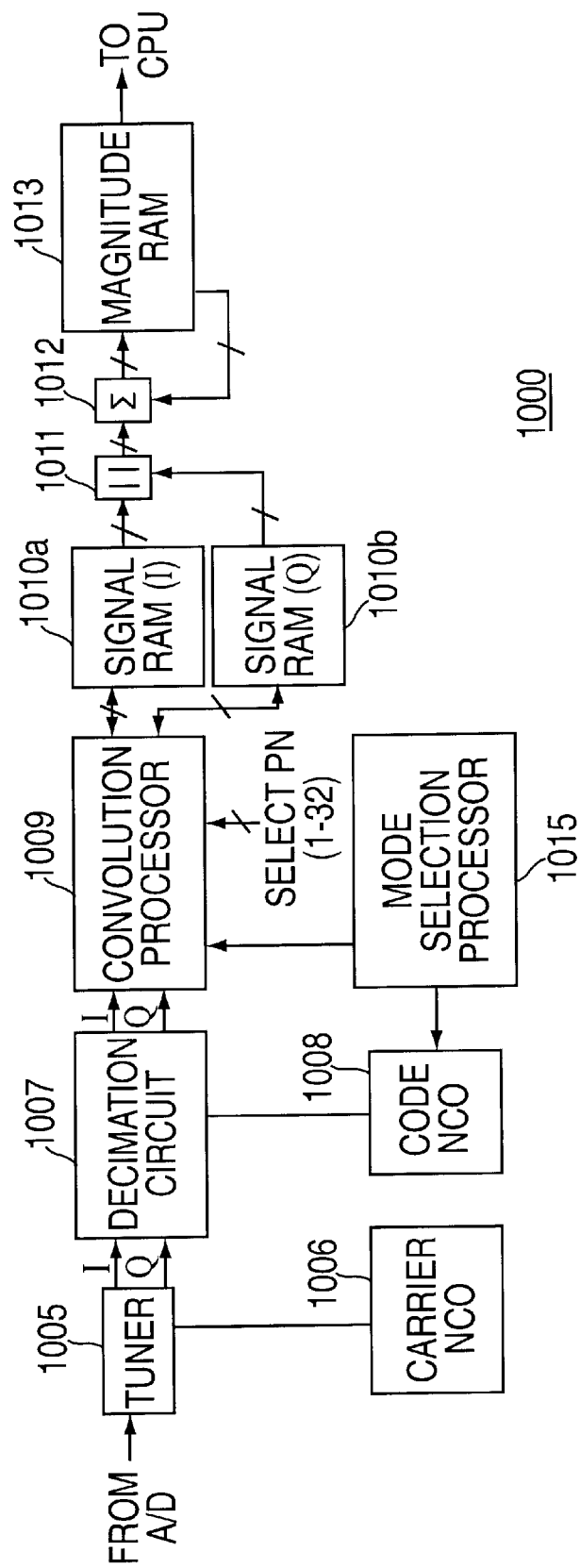
FIG. 10 shows a block diagram of a GPS receiver comprising an alternative embodiment of the invention.

FIG. 10 depicts a block diagram of an alternative embodiment of a GPS receiver 1000 capable of operating in multiple modes of resolution. The GPS receiver 1000 has a convolution processors 1009 that operate either in a standard resolution mode or a high-resolution mode. Moreover, digital signal samples in standard resolution mode are spaced ½ of a C/A code chip apart (i.e., P=2). Digital signal samples in the high-resolution mode are spaced ⅕ of a C/A code chip apart (i.e., P=5). As such, the Code NCO 1008 and the decimation circuit 1007 operate at a plurality of sampling rates. Those skilled in the art can readily devise other values for the sample spacing and understand that the invention can operate in more than two modes of resolution.

The embodiments of FIG. 10 has similar components as those depicted in FIG. 1. Components having the same reference number as those in FIG. 1 operate as described above with respect to FIG. 1. Components such as decimation circuit 1007, Code NCO 1008, convolution processor 1009 and mode selection processor 1002 operate as described below to facilitate the use of a plurality of resolution modes. FIG. 10 further comprises a mode selection processor 1002. The mode selection processor 1002 processes received signals to determine whether the processing channel 1004 should operate in the high or standard resolution mode.

As with the embodiment shown in FIG. 1, FIG. 2 depicts waveforms generated by the components of FIG. 10. Although the waveforms depicted in FIG. 2 are illustrative of operation in standard mode, operation in high-resolution mode would generate waveforms of similar character. Specifically, if P=5 in high-resolution mode, the total number of points in the full convolution would be 5115 rather than 2046. However, as will be described more fully below, only a portion of the convolution is generated in the high-resolution mode.

It should be noted that in standard resolution (i.e., P=2), the least square estimation uses only 4 points over the width of the correlation, as shown by the width 303 of the triangle base in FIG. 3. In the presence of noise, this limits the accuracy of the curve fitting process. Furthermore, in many cases the center of the triangle (i.e., the point of maximum correlation) will reside between the observed correlation values. In this situation, the observed correlation, and hence the observed signal to noise ratio, is significantly lower than the case where the peak of the triangle is close to an observed point. The high-resolution mode improves accuracy and signal to noise ratio by including many, finely spaced points in the least squares estimation process.

Figure 11:
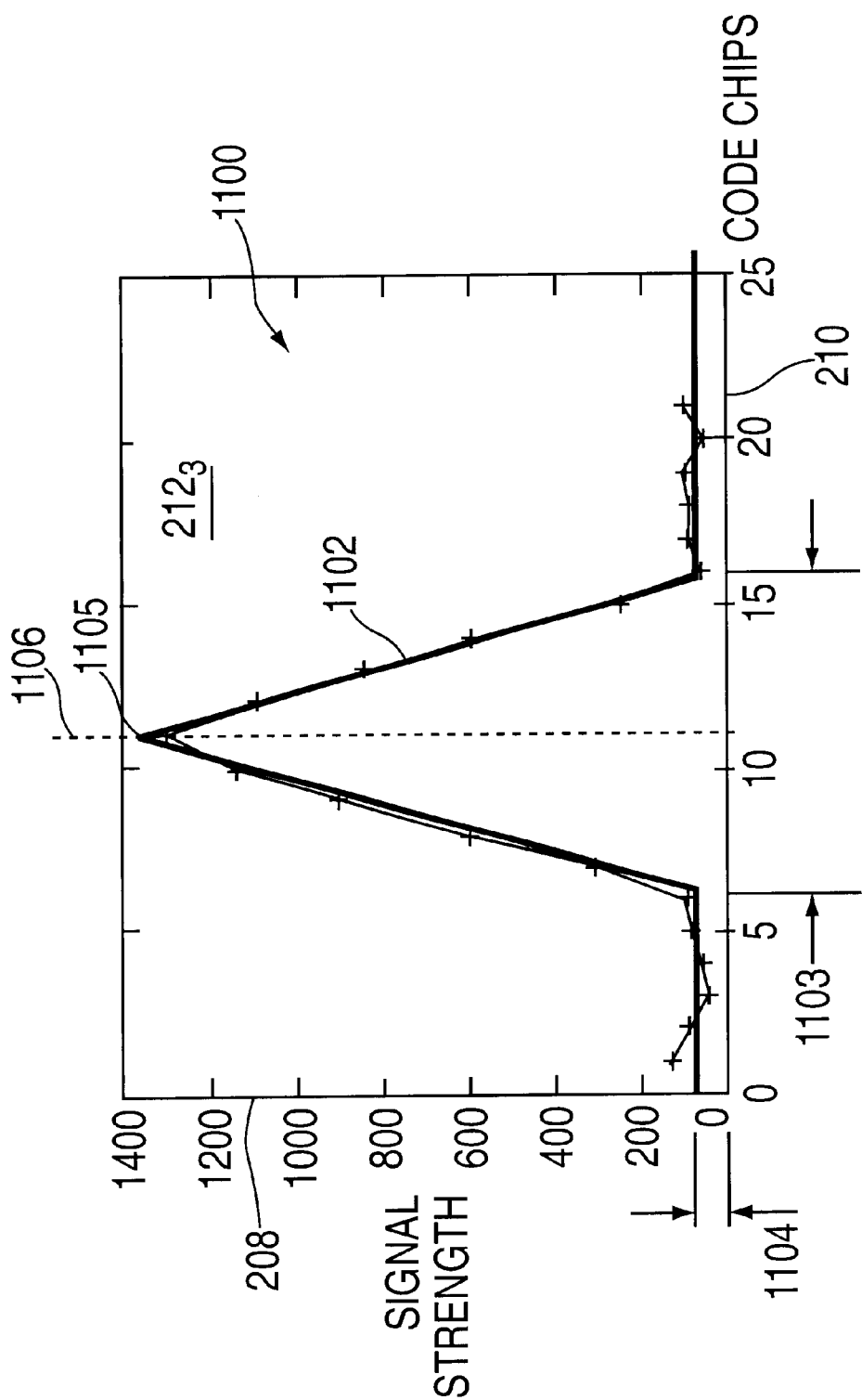
FIG. 11 shows details of an accumulated magnitude waveform in high resolution mode.

Specifically, FIG. 11 shows the details of an accumulated magnitude waveform when the same correlation as shown in FIG. 2 is processed in high-resolution mode. The graph 1100 shows the magnitude of the convolution in the vicinity of a peak 212₃ corresponding to the time delay of the signal processed in high-resolution mode. Points on the code chip axis 210 are spaced at an interval equal to the C/A code chip length divided by P, where P is the ratio of the signal-sampling rate to $f_o$, the C/A code chipping rate. In the high-resolution example, P=5, so the points are spaced at ⅕ chip intervals, or approximately 200 ns. (This spacing in time corresponds to a range difference of approximately 60 meters). In order to achieve high accuracy pseudorange measurements, the output of the convolution is further processed, typically in the CPU 114.

As with standard resolution processing, there are numerous interpolation techniques that can be used to estimate the true time delay, using discrete correlation values provided by the convolution. One embodiment uses a least squares estimation technique to identify parameters of a signal that best fits the noisy data. The correlation response takes on the form of a raised triangle 1102. The width 1103 of the triangle 1102 is exactly 2 C/A code chips, which corresponds to 11 sample points (for the P=5 case). The height 1104 of the base of the triangle 1102 is the magnitude of the noise in the convolution for time delays not corresponding to the signal. The magnitude of this noise can be estimated from the data or pre-calculated based on design parameters, such as the amplifier noise figure, cable and filter loss, and system temperature. The peak 1105 of the triangle 1102 and the center 1106 are unknowns corresponding to the signal magnitude and time delay. The least squares method can be used to estimate these two parameters so as to fit the noisy data points to a triangle with a particular peak and center.

One benefit of the high-resolution mode over the standard resolution mode is that the raised triangle correlation response is sampled at more than twice as many points. As understood by those skilled in the art, the accuracy of the fitting process depends on the number of values used in the estimation. Furthermore, the ratio of the peak of the triangle to the base of the triangle is increased in high-resolution mode. This indicates an improvement in signal to noise ratio, due in part to correlation points being available close to the point of maximum correlation. Thus, high-resolution mode can be used to reliably identify and measure correlation peaks that may not be properly discernable in standard mode. This can be very advantageous when processing low energy signals, such as those signals received indoors from GPS satellites.

As will be described further with regard to FIG. 12, the two modes of operation are achieved by dynamically changing the values of the parameters P, K, and M to obtain the desired resolution. In one embodiment, P=2 (i.e., two samples per C/A code chip) in standard mode and P=5 (i.e., five samples per C/A code chip) in high-resolution mode. The completed correlation points are spaces at 1/P chips apart, thus it is clear that the larger the value of P, the finer the resolution. As discussed above, K is chosen as a design parameter and is a factor of 1023. For simplicity, the remainder of the discussion focuses on one particular embodiment where P=2 and K=33 in standard mode; and P=5 and K=11 in high-resolution mode.

Figure 12:
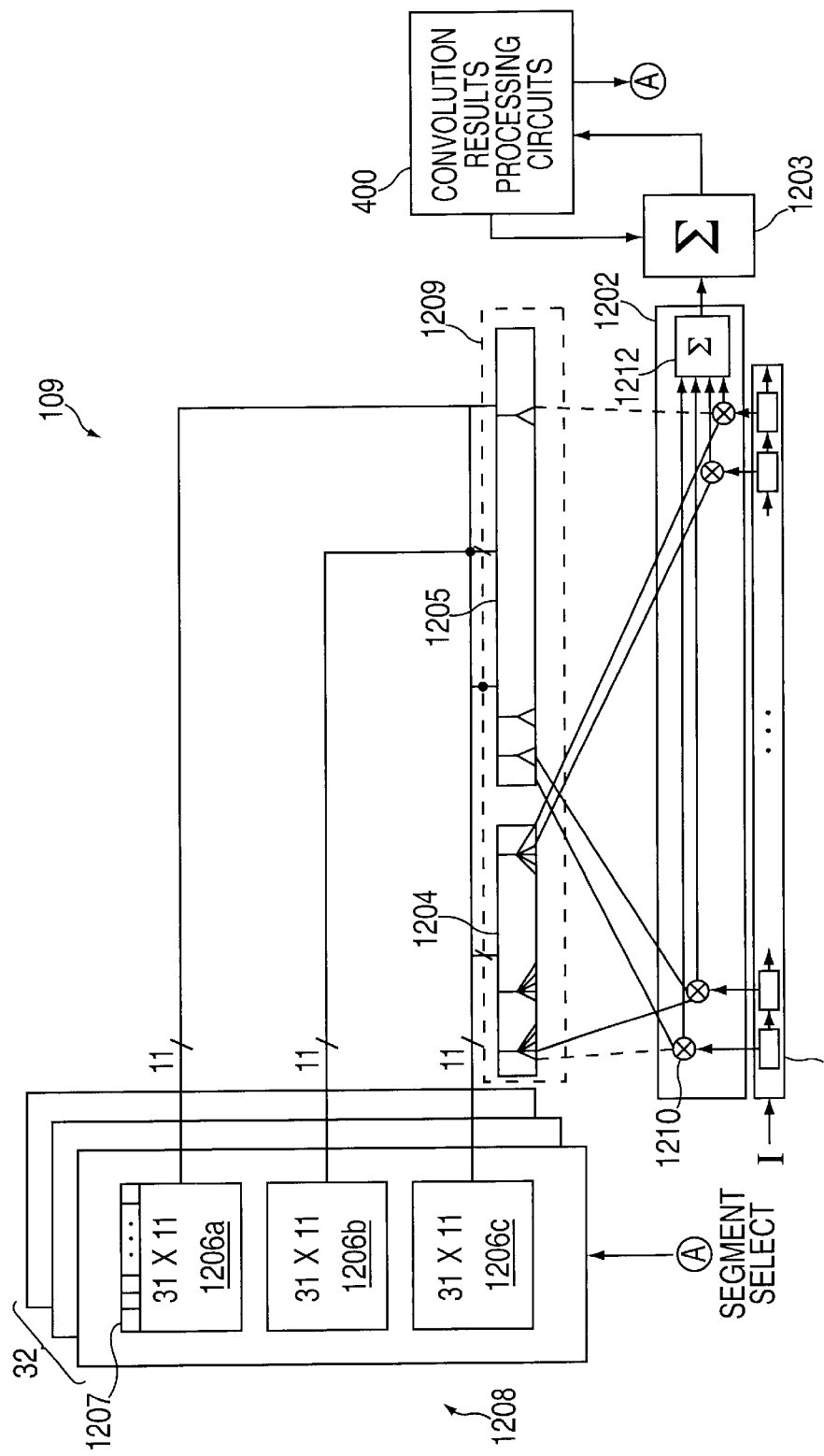
FIG. 12 illustrates an embodiment of a code lookup apparatus suitable for use in the invention of FIG. 10.

FIG. 12 illustrates a block diagram of another embodiment of a convolution processor 1009 suitable for operation of the invention in multiple modes of resolution. For simplicity, only the I channel of processing is shown, but it is clear that the Q channel comprises identical processing elements. In the present embodiment, the convolution processor 1009 comprises a shift register 1201, a vector multiplier circuit 1202, an adder 1203, a code extender 1209, and a code lookup table 1208. The code extender 1209 further comprises a standard code extender 1204 and a high-resolution code extender 1205. The I signal from the decimation circuit 1007 is coupled to the shift register 1201. Shift register 1201 is of variable length since the value of P×K changes with regard to standard and high-resolution modes. Specifically, shift register 1201 must hold 66 samples in standard mode and 55 samples in high-resolution mode. Thus, shift-register 1201 comprises 66 elements to support both lengths. In high-resolution mode, the last 11 elements are disabled.

Signals advance through shift register 1201 at the rate of $Pf_o$ as timed by the code NCO 1008 for either standard mode or high-resolution mode. The signals remain in place for many clock cycles so that a series of partial correlation operations can be performed. Specifically, a total of M partial correlations are performed, where M=1023 /K. For the present example, in standard mode, M=31, and in high-resolution mode, M=93. Each partial correlation consists of a fast vector multiply and add operation between the contents of shift register 1201 and a segment of the code containing P×K code samples. The operation is performed via vector multiplier 1202, which comprises multipliers 1210 and a summer 1212. Similarly to shift register 1201, vector multiplier 1202 is of a variable length to support both standard and high-resolution modes of operation.

The correlation operation consists of multiplying each of the P×K signal samples in shift register 1201 by P×K code samples (formed by extending the code samples with code extender 1209), and summing the results in summer 1212. As discussed above, mathematically, this operation is referred to as the inner product. The results of the vector multiply and add are accumulated by adder 1203 and processed by the convolution results processing circuits 400 in the same manner as discussed above with regard to FIG. 4.

Code lookup table 1208 generates the reference code samples for each partial correlation and is organized to supply code segments for both standard and high-resolution modes. First, the code must be selected from 1 of 32 codes. This selection is constant through the convolution process and is established when the processing channel is configured to correlate for a particular satellite signal. The second index is a segment index between 1 and M. In the present example, the number of samples per segment is 33 in standard mode and 11 in high-resolution mode. To support both modes, the code lookup table 1208 comprises 93 segments 1207 of 11 chips. The 93 segments 1207 are further organized into 3 blocks 1206a–c of 31 segments each. The output of each group 1206a–c (an 11 chip segment) is coupled to the code extender 1209.

In standard mode, the output segment of each group 1206a–c is combined to form a wide segment having 33 chips. Specifically, a segment selection is made between 1 and 31. The segment selection and the code selection are used to multiplex 3 segments 1207 of 11 samples from groups 1206a–c. The segments 1207 are concatenated to form a 33 sample wide segment, which is the input to the standard code extender 1204. In high-resolution mode, the segment selection runs from 1 to 93. Only one of the segments 1207 is chosen from groups 1206a–c. The 11 sample segments 1207 are then coupled to the high-resolution code extender 1205.

In standard mode, the standard code extender 1204 is active, which extends the 33 sample wide code segments to 66 samples. In high-resolution mode, the high-resolution code extender 1205 is active, which extends the 11 sample code segments to 55 samples. Although the code extender 1209 is shown as comprising a standard code extender 1204 and a high-resolution code extender 1205, it is understood by those skilled in the art that they could be functionally combined into a single code extender 1209.

Clock rates change between standard and high-resolution modes. For example, in standard mode, as discussed with regard to FIG. 4, a clocking rate of approximately 127 MHz supports performing a full convolution in real time for the case where P, K, and M are 2, 33, and 31 respectively and two clock cycles are needed per RAM cycle. In the present embodiment, the high-resolution mode parameters P, K, and M are 5, 11, and 93 respectively. Thus the clocking rate to generate the full convolution is:

$$f_{clk} = 5 \times 93 \times 2 \times f_o = 5 \times 93 \times 2 \times 1.023 \text{ MHz} \approx 952 \text{ MHz}$$

Since this rate is difficult to achieve in modern integrated circuit logic, and since the size of the RAMs would grow from 2046 samples to 5115 samples, it may be desirable to generate less than the full convolution when operating in high-resolution mode in order to reduce cost and complexity of the convolution processor 109.

Therefore, in one embodiment, less than the full convolution is computed in high-resolution mode by reducing the number of partial correlations performed for each shift of the input signals. As will be describe below with regard to FIG. 13, the partial correlations are selected so that points of correlation are generated for a specific region of interest within the full convolution. In this alternative embodiment, the clock rate required is:

$$f_{clk}" = 5 \times L \times 2 \times f_o$$

where L, a number smaller than M, represents the number of partial correlations per input cycle shift. Thus, the total number of correlation points generated is P×K×L. For example, in one embodiment L=12 and P×K×L=660, or about ⅛ of a C/A code epoch. In this example, the clocking rate required is:

$$f_{clk} = 5 \times 12 \times 2 \times 1.023 \text{ MHz} \approx 123 \text{ MHz}$$

a value that is commensurate with the clocking rate in standard mode.

Figure 13:
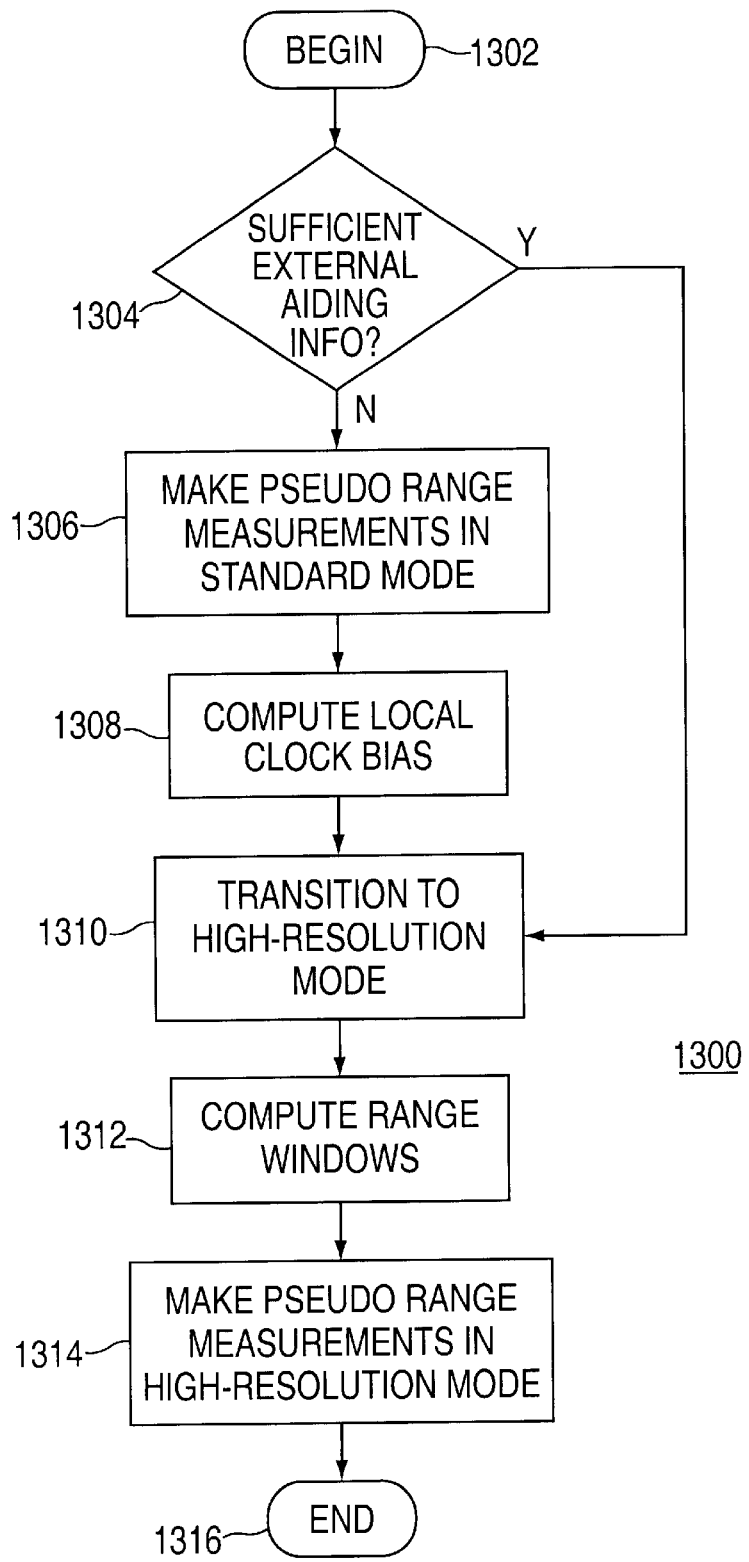
FIG. 13 depicts a flow diagram of a method of operation of the invention of FIG. 10.

Since only a subset of the full convolution is generated, it is necessary to select a portion of interest containing the signal peak. FIG. 13 depicts a flow diagram of a method of operation 1300 of the invention for computing multiple correlation resolutions. The method 1300 begins at step 1302. At step 1304, checks are made to determine whether sufficient external aiding information exists that enables direct use of high-resolution mode. This aiding information could take several forms, including estimated pseudoranges for satellites of interest and an estimate of local clock bias. If the aiding information is sufficiently accurate, the method transitions to high-resolution mode at step 1310. Often times, however, the local clock bias is unknown. For example, estimated pseudoranges may be available from stored ephemeris and a last known receiver position, but, unless the receiver maintains precise timekeeping or is externally synchronized, the local clock bias will be unknown. If there is not sufficient external aiding information, pseudorange measurements are made in standard mode at step 1306. At step 1306, a full convolution is obtained using a standard resolution. After one or more measurements are made in standard mode, the local clock bias is estimated at step 1308. This step optionally includes an estimation of time tag error. The method 1300 then transitions into high-resolution mode at step 1310. At this point, the signal delays can be bounded to a plurality of windows bracketing the correlation peaks at the standard resolution, which is computed at step 1312. After the range windows are computed, the method 1300 makes pseudorange measurements in the high-resolution mode (i.e., using the high resolution correlation peaks) at step 1314. The method 1300 ends at step 1316.

The method 1300 allows the high-resolution mode to be used beneficially notwithstanding the constraint that only a partial convolution is computed. As long as at least one satellite is detected in standard mode, high-resolution mode can be invoked. In high-resolution mode, the sensitivity of the correlation processing is enhanced, which enables additional satellites to be detected. Furthermore, as described above, the accuracy of all measurements is improved in high-resolution mode.

Although various embodiments which incorporate the teachings of the present invention have been shown and described in detail herein, those skilled in the art can readily devise many other varied embodiments that still incorporate these teachings.

What is claimed is:

1. A method for computing correlations of a digital signal with a pseudorandom reference code comprising:
   a) selecting a sample spacing from a plurality of sample spacings;
   b) sampling the digital signal to produce a first set of digital signal samples having a first sample spacing;
   c) dividing a pseudorandom reference code into a plurality of code segments;
   d) selecting a code segment;
   e) forming an inner product between said selected code segment and the first set of digital signal samples to produce a partial correlation;
   f) repeating steps d) and e) to produce a plurality of partial correlations;
   g) summing the plurality of partial correlations as each partial correlation is produced to form a plurality of first correlations.

2. The method of claim 1 further comprising:
   h) selecting a region of interest using said first correlations;
   i) sampling the digital signal to produce a second set of digital signal samples having a second sample spacing; and
   j) performing one or more second correlations between said pseudorandom reference code and said second set of digital signal samples within said region of interest to produce one or more second correlations.

3. The method of claim 2 wherein step j) further comprises:
   j1) dividing the pseudorandom reference code into a plurality of code segments;
   j2) selecting a code segment;
   j3) forming an inner product between said selected code segment and the second set of digital signal samples to produce a partial correlation;
   j4) repeating steps j2) and j3) to produce a plurality of second partial correlations; and
   j5) summing the plurality of second partial correlations as each second partial correlation is produced to form a plurality of second correlations.

4. The method of claim 1 further comprising:
   dividing the pseudorandom reference code into a fixed number of non-overlapping code blocks;
   dividing each of said code blocks into a fixed number of non-overlapping code segments; and
   storing each said code blocks in a lookup table.

5. The method of claim 4 wherein said step d) comprise:
   selecting a code block as said code segment from said lookup table.

6. The method of claim 2 wherein the pseudorandom reference code is a C/A code of the global positioning system.

7. The method of claim 6 wherein said first sample spacing is ½ of a C/A code chip.

8. The method of claim 6 wherein said second sample spacing is ⅕ of a C/A code chip.

9. The method of claim 1 further comprising:
   dividing the digital signal into in-phase and quadrature components; and
   separately performing steps a) through g) on said in-phase and said quadrature components.

10. Apparatus for computing correlations of a digital signal with a pseudorandom reference code comprising:
    a) means for selecting a sample spacing from a plurality of sample spacings;
    b) means for sampling the digital signal to produce a first set of digital signal samples having a first sample spacing;
    c) means for dividing a pseudorandom reference code into a plurality of code segments;
    d) means for selecting code segments;
    e) means for forming inner products between each of said selected code segments and the first set of digital signal samples to produce plurality of partial correlations;
    f) means for summing the plurality of partial correlations as each partial correlation is produced to form a plurality of first correlations.

11. The apparatus of claim 10 further comprising:
    g) means for selecting a region of interest using said first correlations;
    h) means for sampling the digital signal to produce a second set of digital signal samples having a second sample spacing; and
    i) means for performing one or more second correlations between said pseudorandom reference code and said second set of digital signal samples within said region of interest to produce one or more second correlations.

12. The apparatus of claim 11 wherein means for performing one or more correlations further comprises:
    j1) means for dividing the pseudorandom reference code into a plurality of code segments;
    j2) means for selecting code segments;
    j3) means for forming inner products between each of said selected code segments and the second set of digital signal samples to produce a plurality of second partial correlations; and
    j4) summing the plurality of second partial correlations as each second partial correlation is produced to form a plurality of second correlations.

13. The apparatus of claim 10 further comprising:
    means for dividing the pseudorandom reference code into a fixed number of non-overlapping code blocks;
    means for dividing each of said code blocks into a fixed number of non-overlapping code segments; and
    means for storing each said code blocks in a lookup table.

14. The apparatus of claim 13 wherein said means for selecting said code segments comprises:
    means for selecting a code block as said code segment from said lookup table.

15. The apparatus of claim 11 wherein the pseudorandom reference code is a C/A code of the global positioning system.

16. The apparatus of claim 15 wherein said first sample spacing is ½ of a C/A code chip.

17. The apparatus of claim 15 wherein said second sample spacing is ⅕ of a C/A code chip.

18. A method of computing correlations between a pseudorandom reference code and a digital signal having a repeating code, the method comprising:
    a) selecting a sample spacing from a plurality of sample spacings;
    b) sampling the digital signal to produce a first set of digital signal samples having a first sample spacing;
    c) dividing a pseudorandom reference code into a plurality of code segments;

d) selecting a portion of the repeating code of the digital signal;
e) selecting a code segment;
f) forming an inner product between said selected code segment and the selected portion of said repeating code to produce a partial correlation;
g) repeating steps e) and f) to produce a plurality of partial correlations;
h) repeating steps d) through g) for a plurality of portions of the repeating code;
g) accumulating the plurality of partial correlations as each partial correlation is produced to form a plurality of first correlations.

19. The method of claim 18 further comprising:
h) selecting a region of interest using said first correlations;
i) sampling the digital signal to produce a second set of digital signal samples having a second sample spacing; and
j) performing one or more second correlations between said pseudorandom reference code and said second set of digital signal samples within said region of interest to produce one or more second correlations.

* * * * *